United States Patent [19]

Carlsson et al.

[11] 4,172,034
[45] Oct. 23, 1979

[54] METHOD AND APPARATUS FOR INTEGRATED LOCAL TREATMENT OF BIOLOGICALLY DEGRADABLE WASTE

[75] Inventors: Carl G. H. Carlsson, Tomelilia; Lars W. Pihl, Lund, both of Sweden

[73] Assignee: Euroc Aministration AB, Malmö, Sweden

[21] Appl. No.: 877,459

[22] Filed: Feb. 13, 1978

Related U.S. Application Data

[60] Continuation of Ser. No. 689,299, May 24, 1976, abandoned, which is a division of Ser. No. 508,944, Sep. 24, 1974, abandoned.

[30] Foreign Application Priority Data

Oct. 1, 1973 [SE] Sweden .................... 7313306

[51] Int. Cl.² ............................................. C02C 5/10
[52] U.S. Cl. ................................... 210/178; 210/197; 210/208; 210/219; 210/12

[58] Field of Search .................. 210/12, 15, 18, 14, 210/11, 13, 142, 150–152, 177–180, 182, 221 R, 195 R, 247, 218–220, 221 M, 197, 205–208; 195/109, 142, 143; 4/10

[56] References Cited

U.S. PATENT DOCUMENTS

| | | | |
|---|---|---|---|
| 1,734,011 | 10/1929 | Harrison | 210/15 |
| 2,188,847 | 1/1940 | Streander | 210/14 |
| 2,315,577 | 4/1943 | Bach | 210/12 |
| 3,623,977 | 11/1971 | Reid | 210/12 |
| 3,846,291 | 11/1974 | Brucker | 210/220 |
| 3,864,247 | 2/1975 | Fuchs | 210/12 |

*Primary Examiner*—Benoît Castel
*Attorney, Agent, or Firm*—Beveridge, DeGrandi, Kline & Lunsford

[57] ABSTRACT

This invention relates to a compact apparatus for treating heterogeneous waste comprising a substantial proportion of biologically degradable solid matters and liquid constituents.

5 Claims, 3 Drawing Figures

METHOD AND APPARATUS FOR INTEGRATED LOCAL TREATMENT OF BIOLOGICALLY DEGRADABLE WASTE

This is a continuation of application Ser. No. 689,299, filed May 24, 1976, now abandoned, which was, in turn, a division of application Ser. No. 508,944 filed Sept. 24, 1974, also abandoned.

The present invention relates to an apparatus for integrated local treatment of biologically degradable waste, such as "house-refuse", that is, garbage, paper, etc., and human body waste matter.

In view of the rapidly increasing costs of the currently used methods of centrally collecting and destructing all house-refuse, it is believed that in future we must face an ever more pronounced decentralization of house-refuse treatment, which means that all biologically degradable refuse will be treated locally near the source and that only non-degradable rest products will be collected at central refuse facilities.

The devices, previously suggested, for biological degradation of house-refuse have, almost without exception, operated on the principle of aerobic dry-composting, which has strongly limited the possibilities of introducing liquid waste in addition to the amounts of urine associated with feces. The dry-composting reaction is so sensitive to external disturbances that it may almost completely cease when an occasional increase in liquid supply occurs above the maximum design capacity. The normal aerobic composting reaction will in that case start only when a sufficient volume of liquid has evaporated. During the slow-down of the aerobic composting due to an exceedingly elevated liquid content, an anaerobic decay may start, which results int.al. in the generation of unpleasant odors.

To optimize, if possible, the dry-composting reaction, many of the previously known devices have been equipped with thermostatically controlled heating coils for the evaporation of excess liquid and means for the forced air supply, but despite this aid there is a rather small difference between the degradation attained in this manner and the degradation attained in a conventional compost pile, although the rate of degradation in the above-mentioned devices usually is higher than in the compost pile. The composting rate for feces and food refuse in such devices is, in a normal run, relatively satisfactory, but the capacity of the devices to degrade paper and similar cellulose materials at the desired rate is limited. Furthermore, the composting reaction will proceed erratically due to the fact that a mixture of dry house-refuse and feces is a most heterogeneous material, the components of which will generally be mixed in layers. This erratic composting process makes a complete degradation of all the degradable material difficult and the resulting residual refuse may therefore contain not only pathogenic bacteria (pathogens) but also worm eggs and weed seeds. Hence, such a residue cannot be dumped just anywhere.

However, it has been found that relatively homogeneous liquid wastes, such as digested sludge, poultry and pig manure, can, under certain circumstances, be degraded in a liquid phase with the aid of aerobic thermophilic microorganisms, whose optimum viability lies in a temperature range of about 50°–70° C. To avoid that the aerobic degradation is converted to an anaerobic degradation a combination of a rather efficient mixing of the liquid refuse and an aeration or oxygenation thereof is required. In case the degradation treatment is conducted in sufficiently insulated vessels, the exothermic reaction will maintain the desired reaction temperature.

The aerobic thermophilic degradation carried on in a liquid phase in fact creates so much heat that it produces, in its active cycles, substantially more heat than that required to compensate for the heat losses, and maintaining the required reaction temperature thus poses no problem during the course of reaction.

The present invention to some extent opens up new possibilities of applying the aerobic thermophilic wet-composting process, since it makes it possible to utilize this process also for biological degradation of very heterogeneous waste mixtures, the original composition of which may vary within very broad limits. Thus, we have found that it is possible to disregard the original composition of the waste by finely dividing and mixing the waste as well as with enough water to produce an easy-flowing slurry. The dry solids content of such a slurry, without loss of flowability, can vary from about 1 to 15 percent by weight, preferably from 5 to 10 percent by weight, depending on the composition of the waste. The lower dry solids content primarily applies to waste rich in cellulose materials. The degree of fineness is not necessarily very critical. However, since an increased particle size prolongs the degradation time, the particle size of the finely divided waste should only in exceptional cases be allowed to exceed 1 to 2 mm in diameter. Particles having a small cross section but considerable length, e.g. fibers, may be tolerated.

When common domestic waste of normal composition, e.g. food refuse, food package residues, and feces, is degraded, about one fifth of the waste can be expected to be completely inert to biological degradation and this waste residue must also in the future be handled centrally regardless of the method of treatment. By local degradation of all degradable material it is consequently possible to reduce the domestic waste by four fifths. Since the residue obtained by the method according to the present invention furthermore is completely harmless to man and animals due to the fact that it does not contain any viable pathogenic bacteria, viable worm eggs or the like, it is possible to use the residue, after removal of metals, glass and preferably also plastic residues, for example as a soil improving agent. The killing effect of the thermophilic degradation can be explained partly as a consequence of the relatively high temperature which prevails during the degradation and partly by the presence of the antibiotics which are produced in the course of degradation by the thermophilic bacteria.

The aqueous waste slurry prepared in the manner described above is agitated during its continued treatment, either continuously or intermittently, to such an extent that its solid components are prevented from settling or forming layers. At the same time the slurry is heated to the thermophilic temperature range. Thermophilic bacteria capable of degrading organic matter to carbon dioxide and water are normally present in larger or smaller amounts in all types of biologically degradable waste materials, and this is the reason why such bacteria need not normally be added. The desired degradation reaction can, however, be accelerated by inoculating the waste slurry with an adequate culture of bacteria. Since there are many different types of thermophilic bacteria having different properties, it is possible, when such an inocculation is done, to choose a culture of bacteria having a well-documented capacity of degrading the main components of the waste in question. Especially when treating waste materials which are difficult to degrade, i.e. have a high cellulose content, it is advantageous to inocculate a culture of bacteria.

When the temperature of the waste slurry has been elevated to the thermophilic range, the heating is stopped while the agitation is continued and an oxygen-rich gas, preferably ordinary air, is introduced, either in the form of small bubbles which are distributed in the slurry, or by giving the slurry a large contact surface in relation to the ambient air, e.g. by dividing the slurry into fine droplets (spraying) or by spreading it to a thin flowing layer. The oxygenation of the slurry must be of such magnitude that the oxygen need of the thermophilic bacteria is satisfied. Normally, an oxygen feed corresponding to 0.2 to 2.0 g air per liter of slurry and hour, will probably be sufficient. No absolutely critical limits for the oxygen feed can be recommended. However, too low an oxygen content in the slurry will result in a gradual transition to an anaerobic degradation, whereas too high an oxygen feed will result in heat losses, causing the contact between the oxygen of the air and the aerobic bacteria to be instable. Besides, the only possibility of introducing too large a volume of air or oxygen is to force it into the slurry, and too much feed of air or oxygen will, therefore, also result in a violent bubbling in the slurry. Thermophilic aerobic bacteria can be poisoned only when pure oxygen is supplied in too large amounts.

As earlier mentioned, the aerobic thermophilic degradation will result in a temperature elevation in the slurry in case excess heat is not diverted. Use can easily be made of the excess heat by condensing, in a reflux condenser, the water that has evaporated from the slurry. Calculations show that the excess heat generated on the degradation of the house-refuse of an average family and useful e.g. for central heating purposes corresponds to that of one or two radiators. Recycling of the condensed water from the reflux condenser to the slurry is regulated such that the consistency and temperature of the slurry is kept within appropriate limits. The flowability of the slurry must always be such that the slurry is readily miscible and oxygenatable. The temperature of the slurry should be maintained within the range of 50° to 70° C., preferably 55° to 60° C., during the course of the degradation.

By elevating the slurry temperature to the thermophilic range it is possible, already before oxygenation, to initiate an earlyphase high-intensity degradation. In this way, it is possible to degrade the major part of all the biologically degradable material to carbon dioxide and water during the first 24 hours. After 5 to 7 days all biodegradable material has been consumed and all pathogenic bacteria destroved. The remainder can easily be divided into hygienically unobjectionable liquid and non-degradable residues. This division can be accomplished for instance by sedimentation, filtration or centrifugation. Disposable filters, if employed, may be used as transport packaging material for the solid residual products.

For practical runs with an apparatus according to the invention, in which a mixture of house-refuse, feces and water (dry solids 8%) was degraded for six days at an average temperature of 57° C., there was obtained after the separation of the solid refuse residues a residual water which was characterized by a faint yellow colour and a faint smell of damp soil. A normal coli test (i.e. "water test") of the residual refuse slurry at the end of the degradation period, gave zero (0) cultures per 100 ml. This can be advantageously compared with the sanitary requirements placed on drinking-water, viz. 0 to 7 cultures per 100 ml, and on bathing water, viz. <1000 cultures per 100 ml.

The apparatus of the present invention is more fully elucidated hereinbelow and with reference to the accompanying drawings, which illustrate some embodiments thereof.

Figure 1:
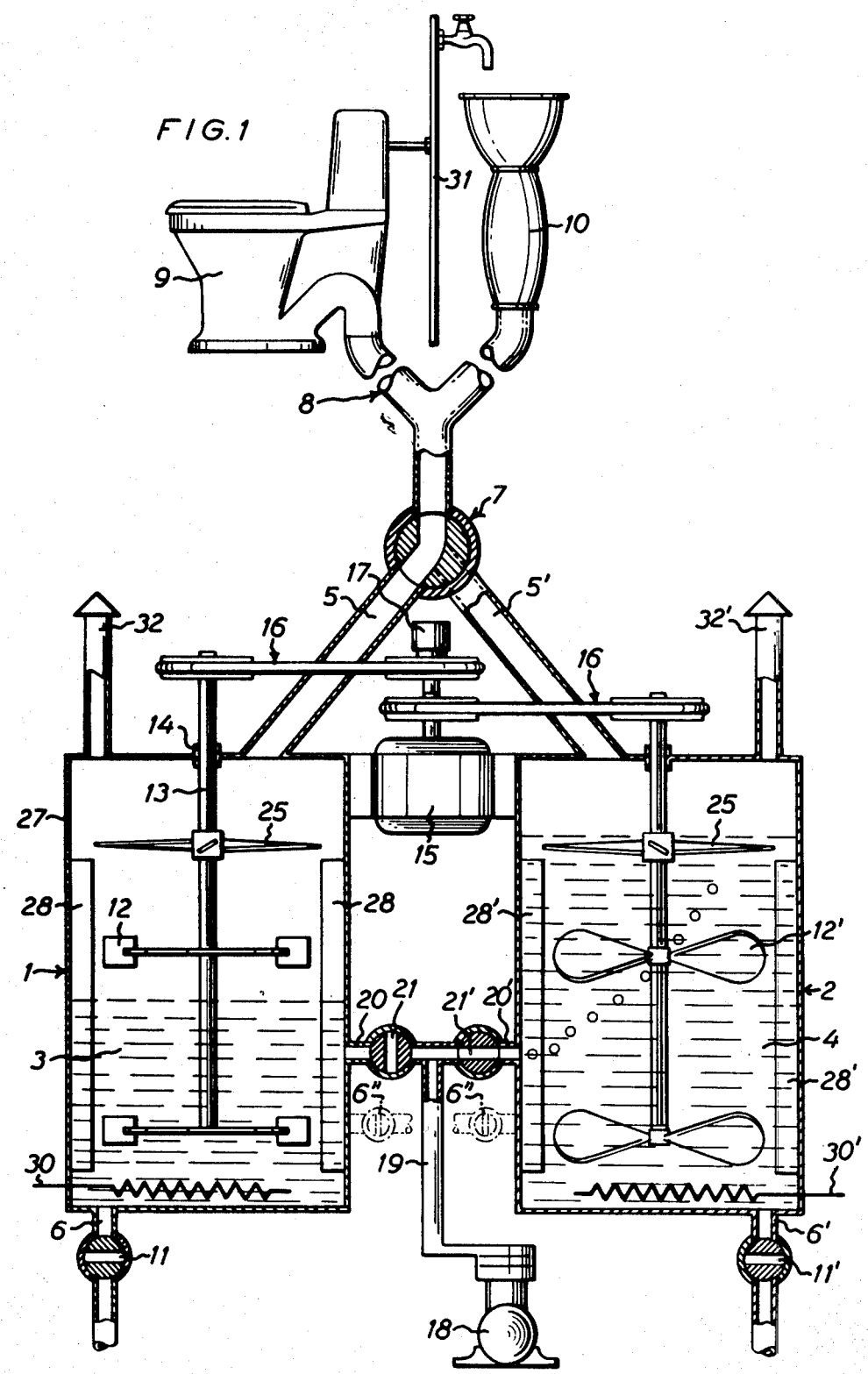
FIG. 1 shows a diagrammatic view and a simplified form of an apparatus according to the invention, primarily intended for the treatment of refuse from individual households.

The apparatus illustrated in FIG. 1 comprises two separate decay or decomposition reactors 1, 2 each having a preferably substantially cylindrical receiving chamber 3 and 4, respectively, with an upper inlet 5 and 5', respectively, and a lower outlet 6 and 6', respectively. The two inlets 5, 5' are arranged to be connected alternately, via a multiway valve 7, to the drain 8 of a water-closet 9 and a kitchen disintegrator 10, while the two outlets 6, 6' each of which has a shut-off valve 11 and 11', respectively, can lead to a common discharge (not shown).

Mounted in each reactor chamber is an agitator 12 and 12', respectively. Each agitator has a vertical shaft 13 which has its upper end portion mounted for example in the upper wall of the reactor as shown at 14. The shafts 13 of the two agitators 12, 12' can be driven from a common motor 15 over a suitable transmission, for example a chain transmission 16, and a clutch 17 which is driven by the motor and adapted to permit the agitators 12, 12' to be driven separately and possibly also simultaneously.

The two reactor chambers 3, 4 have connected to them a device for blowing in air at a level beneath the surface of the slurry of solids and liquid received in the respective chamber from the water-closet 9 and the kitchen disintegrator 10. Said device for blowing in air is shown in the form of an air compressor 18 the pressure line 19 of which is connected via two branches 20, 20' to the two reactor chambers. The branch lines 20, 20' each have a shut-off valve 21 and 21', respectively.

In FIG. 1, the valve 7 is set for supply of liquid-suspended refuse, that is slurry, from the apparatuses 9, 10 to the lefthand reactor chamber 3. The right-hand chamber 4 is already filled up to a given level and shut off from the apparatuses 9, 10. The valve 21 blowing air into the left-hand reactor chamber 3 is shut and the valve 21' blowing air into the righthand reactor chamber 4 is open; through said valve 21' air is blown into the slurry. It is further assumed that the motor 15 drives the agitator 12' in the right-hand reactor chamber 4 while the agitator 12 in the left-hand reactor chamber 3 may be at standstill.

With the use of a system of two or, if desired, more reactors 1, 2 a more uniform and rapid treatment and degradation of the refuse is made possible than if the system comprised but one reactor.

Figure 2:
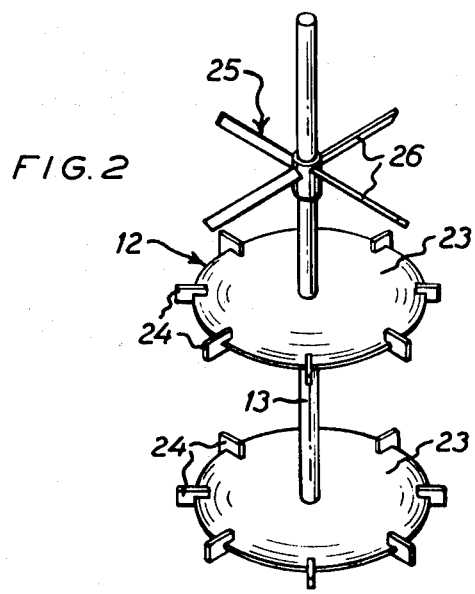
FIG. 2 shows an advantageous construction of an agitator in the apparatus illustrated in FIG. 1.

The agitators 12, 12' in the two reactor chambers 3, 4 may be of the type illustrated in FIG. 2, where the agitator is designated 12. The agitator 12 in FIG. 2 includes two agitating means 23 mounted in spaced apart relationship on the shaft 13 and having blades 24 and foam breaking means 25 which is mounted on the shaft 13 above the upper agitating means 23 and on a suitable level for actuation of the foam on the surface of the slurry in the working reactor chamber (see the right-hand chamber 4 in FIG. 1). The foam breaking means 25 may be a number of oblique vanes 26 with relatively thin or sharp edges.

In order further to intensify the agitating effect in the respective reactor chamber one or more bars 28, 28' may be mounted on the vertical chamber wall, said bars having the task of acting upon the vortex which has been generated in the slurry by the agitator 12, 12', and more particularly of breaking up a fully regular vortex pattern. A combination of a double-blade agitator of the type illustrated in FIG. 2 and stationary bars 28, 28' in the respective chambers has proved to provide an extremely favourable mixing effect in the slurry.

The vanes 26 of the foam breaking means 25 may be attached to the respective shaft in such a position that they will be situated somewhat above the normal liquid level in the respective chamber during operation, for instance about 5 to 10 cm above that level. The vanes 26 have the task of breaking up the excess foam and pressing it back into the slurry. A foam layer of restricted thickness may, however, be of a certain value because of its heat insulating capacity, but it must not be allowed to grow too thick. The vanes 26 illustrated may have the configuration of impeller blades of varying pitch. The stationary ribs 28 may extend from a point at or below the normal surface level of the slurry, when the respective chamber is filled, to a point short of the bottom of the chamber.

A heating element 30, 30' is arranged at the bottom of each reactor chamber. This heating element is intended for elevating the temperature of the slurry in the respective reactor chamber during an initial phase of the treatment and can therefore be rightly designated 'starting element'.

Temperature control means (not shown) may also be provided.

The two reactors 1, 2 may have double outlets 6, 6', 6"at different heights, whereby after a short time of sedimentation in the respective chamber relatively pure water can be withdrawn through the upper outlet while the sludge-rich fraction of the slurry can be emptied through the lower outlet.

The flush water from the water-closet 9 and the kitchen disintegrator 10 is used for the preparation of the aqueous sludge. The kitchen refuse is finely divided in the disintegrator while the agitators provide a fine division of the feces. Flush water to the disintegrator and the closet is supplied via a water piping system 31.

Instead of the agitator shown in FIG. 2, which consists of two planar discs on a shaft and a number of radial, peripherally distributed planar blades 21, use may naturally be made of agitators of the impeller, paddle or like type.

As shown in FIG. 1, each reactor chamber may have at its upper end a gas outlet 32 and 32', respectively, which may optionally be arranged to be closed by means of a shutter (not shown).

Figure 3:
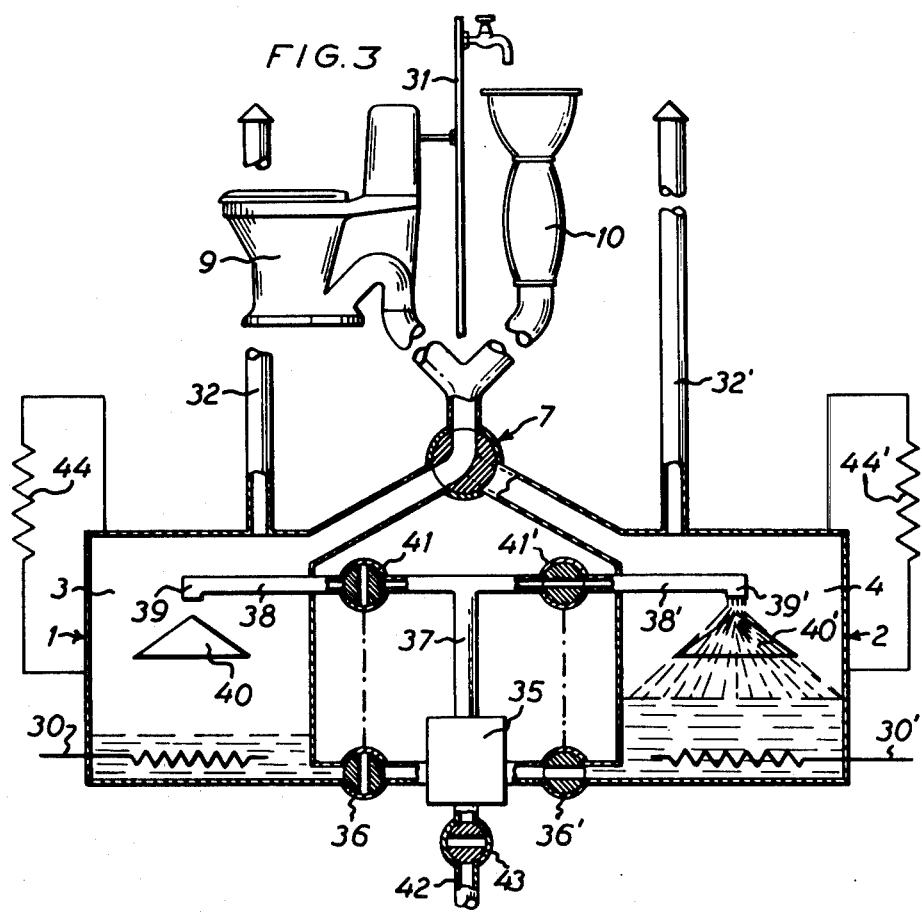
FIG. 3 shows a modified embodiment of the apparatus.

The modified embodiment in FIG. 3 comprises the two reactors 1, 2 having the reactor chambers 3, 4, the distributing valve 7 for alternately connecting the reactor chambers to the water-closet 9 and the kitchen disintegrator 10, the gas outlets 32, 32' and the starting elements 30, 30'. FIG. 3, same as FIG. 1, shows the left-hand reactor chamber being filled and the right-hand reactor chamber in operation for refuse treatment.

However, in lieu of the agitators in FIG. 1, the embodiment shown in FIG. 3 makes use of a disintegrating sludge pump 35, for instance of the oblique-plate or wobble-plate rotor type. The inlet of said sludge pump is connected to each reactor chamber 3, 4 near the chamber bottom via a shut-off valve 36 and 36', respectively, while the outlet 37 of the pump is connected via two branch pipes 38, 38' to injection nozzles 39, 39', one nozzle being located in each chamber. Beneath the nozzle in each chamber is mounted a means, configured for instance as a cone 40 and 40', respectively, with upwardly directed apex and arranged to split up the injected slurry and to ensure the provision of a good contact surface between the injected slurry and the air in the upper part of the reactor. The two branch pipes 38, 38' each contain one shut-off valve 41 and 41', respectively.

In FIG. 3, the shut-off valve 36' in the inlet pipe of the pump and the shut-off valve 41' in the outlet branch pipe 38' of the pump are shown in the open position, it being assumed that the right-hand reactor chamber 4 is in operation, while the corresponding left-hand valves 36 and 41 are closed. The distributing valve 7 is open to the left-hand chamber for admission of refuse slurry thereinto, while the right-hand chamber is in operation.

In the embodiment shown in FIG. 3 the two reactor chambers 3, 4 have a common outlet 42 provided with a shut-off valve 43 which is closed during the operating phases illustrated in FIG. 3.

As indicated by dash lines in FIG. 3, the four valves of the sludge pump 35 may be arranged so as to permit pairwise operation thereof.

The sludge pump 35 can also be used for emptying an optional one of the reactor chambers 3, 4 through the central outlet 42. By using a pump 35 that provides a grinding effect, the refuse will be continuously disintegrated in connection with the slurry being pumped round for blending and aeration.

As illustrated in FIG. 3, it may be advantageous to connect to each reactor chamber 3, 4 a reflux cooler 44 for recondensation of liquid evaporated in the respective reactor chamber and for recycling the liquid to the slurry as well as for utilization of the excess heat of the liquid. Gases, such as carbon dioxide formed and excess air, can be discharged through the venting outlets 32, 32'.

It is to be observed that the aeration and resulting oxygenation also aim at decreasing the diffusion resistance in the liquid phase of the slurry so that the aerobic thermophilic degradation thereof takes place in short time.

The apparatus according to the invention for carrying the refuse treating method into effect should not be considered restricted to the embodiments described above and shown in the drawings, since it permits being modified within the spirit and scope of the appended claims. The double reactors described above are specially dimensioned for normal-size households, but it is readily seen that, in principle, the same kind of apparatus can be dimensioned for the treatment of waste from cow-houses and stables which produce waste in the form of manure, hay and straw residues, feed rests etc., and the apparatus can of course also be dimensioned for blocks of flats and large apartment and office buildings.

What we claim and desire to secure by Letters Patent is:

1. An apparatus for batchwise biological degradation treatment of waste containing a substantial proportion of biologically degradable solid and liquid substances (including house refuse), said apparatus comprising at least two reactor vessels, each vessel comprising:
   (A) reactor chamber means for holding said waste during said biological degradation treatment, said chamber means having upper inlet means;
   (B) supplying means common to said vessels for supplying waste from a waste source to said vessels, said supplying means comprising means for delivering said waste alternately to the reactor chambers of said vessels, one of said reactor chambers being an active reactor chamber for biological degradation of a batch of waste therein when the other reactor chamber is receiving waste from said source through said delivering means, and vice versa;
   (C) means operatively associated with each of said reactor chambers for effecting size reduction of the solid substances in said waste and for mixing solid waste of reduced size and liquids to form a homogeneous slurry in the reactor, said means comprising a motor driven rotatable agitator supported in the reactor chamber means and provided with a plurality of agitator blades and stationary bars mounted on the walls of each of said reactor chamber means to break up a vortex pattern generated in the slurry by said agitator;
   (D) means operatively associated with each of said reactor chambers for adding diluent water to the waste;
   (E) oxygenation means operatively associated with each of said reactor chambers for bringing said slurry in the chamber which is operating for said batchwise degradation into contact with a gas containing free oxygen, said oxygenation means including a source of air under pressure and an air jet connected to said source and opening into the reactor chamber means, said jet being adapted to spread and distribute blown-in air from said source substantially uniformly in the slurry, and means for breaking up excess foam on the surface of the slurry and pressing it back into the slurry;
   (F) heating means adjacent the bottom of each of said reactor chambers; and
   (G) closable outlet means positioned adjacent the lower portion of each of said reactor chambers for the discharge of treated waste therefrom.

2. An apparatus as claimed in claim 1 wherein each of said vessels has one closable air jet for blowing air into said vessels, said jet being connected to a common source of air.

3. An apparatus for batchwise biological degradation treatment of waste containing a substantial proportion of biologically degradable solid and liquid substances (including house refuse), said apparatus comprising at least two reactor vessels, each vessel comprising:
   (A) reactor chamber means for holding said waste during said biological degradation treatment, said chamber means having upper inlet means;
   (B) supplying means common to said vessels for supplying waste from a waste source to said vessels, said supplying means comprising means for delivering said waste alternately to the reactor chambers of said vessels, one of said reactor chambers being an active reactor chamber for biological degradation of a batch of waste therein when the other reactor chamber is receiving waste from said source through said delivering means, and vice versa;
   (C) means for mixing operatively associated with each of said reactor chambers including a recirculating pump for pumping said slurry from a lower level in each of the reactor chamber means through a recirculation line to an upper level in the reactor chamber means, said pump being adapted to effect size reduction of at least a substantial proportion of the solid substances in the slurry while simultaneously stirring said slurry and mixing the solid waste of reduced size and liquid to form a homogeneous slurry in the reactor;
   (D) means operatively associated with each of said reactor chambers for adding diluent water to the waste;
   (E) oxygenation means operatively associated with each of said reactor chambers comprising return means for delivering said slurry from said pump into an air containing space of the reactor chamber means which is operating for said batchwise degradation above the top surface of the slurry therein to effect oxygenation of said recirculated slurry, said return means being an inlet from the recirculation line so positioned in the air containing space of the reactor chamber means that the slurry pumped into the reactor chamber means strikes a baffle also positioned in the air containing space, said baffle spreading the slurry so that a large surface area of the slurry is exposed to the air;
   (F) heating means adjacent the bottom of each of said reactor chambers; and
   (G) closable outlet means positioned adjacent the lower portion of each of said reactor chambers for the discharge of treated waste therefrom.

4. An apparatus as claimed in claim 3, wherein the return means is a spraying nozzle disposed in said space.

5. An apparatus as claimed in claim 3, wherein the reactor vessels are adapted to operate alternately for batchwise treatment of the waste, wherein the recirculation line is closable, and the reactor vessels use a common circulating pump.

* * * * *